(12) United States Patent
Biegler et al.

(10) Patent No.: US 8,073,722 B2
(45) Date of Patent: Dec. 6, 2011

(54) METHODS AND SYSTEMS FOR A MULTI-LEVEL SCHEDULING FRAMEWORK

(75) Inventors: Hans-Juergen Biegler, Schwetzingen (DE); Thorsten Kulick, Bensheim-Schoenberg (DE); Tesfaldet Negash, Leimen (DE); Jan S. Ostermeier, Wiesloch (DE); Tobias Scheuer, Edingen (DE); Thomas Schulz, Speyer (DE); Stefan Wedner, Karlsruhe (DE)

(73) Assignee: SAG AG, Walldorf (DE)

( * ) Notice: Subject to any disclaimer, the term of this patent is extended or adjusted under 35 U.S.C. 154(b) by 1483 days.

(21) Appl. No.: 11/024,878

(22) Filed: Dec. 30, 2004

(65) Prior Publication Data

US 2005/0288983 A1    Dec. 29, 2005

(30) Foreign Application Priority Data

Jun. 24, 2004 (EP) .................................. 04076840

(51) Int. Cl.
  *G06Q 10/00* (2006.01)
(52) U.S. Cl. ....... 705/7.12; 709/223; 709/201; 717/101; 717/151; 717/162
(58) Field of Classification Search ....................... 705/8
  See application file for complete search history.

(56) References Cited

U.S. PATENT DOCUMENTS

| | | | |
|---|---|---|---|
| 6,345,239 B1 * | 2/2002 | Bowman-Amuah | 703/6 |
| 7,124,101 B1 * | 10/2006 | Mikurak | 705/35 |
| 7,165,041 B1 * | 1/2007 | Guheen et al. | 705/26.1 |
| 7,315,826 B1 * | 1/2008 | Guheen et al. | 705/7.29 |
| 2002/0198616 A1 * | 12/2002 | Crampton et al. | 700/99 |
| 2005/0154625 A1 * | 7/2005 | Chua et al. | 705/7 |
| 2006/0235732 A1 * | 10/2006 | Miller et al. | 705/7 |

OTHER PUBLICATIONS

Shaw, Mary. "Some Patterns for Software Architectures." Pattern Languages of Program Design, vol. 2, pp. 255-269, Addison Wesley, 1996. p. 12.*

Tyson, Jeff. "The Layers." How OSI Works, http://web.archive.org/web/20030609223632/http://computer.howstuffworks.com/osi1.htm, available on Jun. 9, 2003, visited on Apr. 1, 2004.*

(Continued)

*Primary Examiner* — Lynda Jasmin
*Assistant Examiner* — Gurkanwaljit Singh
(74) *Attorney, Agent, or Firm* — Finnegan, Henderson, Farabow, Garrett & Dunner, LLP

(57) ABSTRACT

A method for providing a planning framework for use in managing a project to be planned in a supply chain, comprising providing a first software layer for storing and manipulating planning data relative to the planning project; providing a second software layer for communicating with the first software layer, the second layer arranged for pre processing, preparing and post processing a predetermined planning method. By such a multilayered framework, the invention is able to execute a planning algorithms to solve multi-level planning problems, wherein generic modules can be executed as fast modules in an environment that is highly optimized in terms of load on time and system resources and specifically adapted modules are embodying a particular planning strategy that can operate on a different level that is highly flexible.

17 Claims, 4 Drawing Sheets

OTHER PUBLICATIONS

Unsal, Osman Sabri (2003). System-level power-aware computing in complex real-time and multimedia systems. Ph.D. dissertation, University of Massachusetts Amherst, United States—Massachusetts.*

Fei, Yunsi (2004). System-level energy analysis and optimization of embedded systems. Ph.D. dissertation, Princeton University, United States—New Jersey.*

Stecher, Peter. (1993). Building business and application systems with the Retail Application Architecture. IBM Systems Journal, 32(2), 278.*

J Leon Zhao, & Akhil Kumar. (Oct. 1998). Data management issues for large scale, distributed workflow systems on the Internet. Database for Advances in Information Systems, 29(4), 22-32.*

* cited by examiner

METHODS AND SYSTEMS FOR A MULTI-LEVEL SCHEDULING FRAMEWORK

RELATED APPLICATIONS

This application is based upon and claims the benefit of priority from prior patent application EP 04076840.0, filed Jun. 24, 2004, the entire contents of which are expressly incorporated herein by reference.

BACKGROUND

I. Technical Field

The present invention relates to a method for providing a planning framework for use to solve planning problems.

II. Background Information

Typically, in a planning strategy, for instance for managing a supply chain or workflow or the like, a number of planning activities need to be scheduled in order to arrive a valid planning strategy. Aspects of such validity comprise the absence of planning activities that occur in the past, the absence of double bookings of planned resources, like production machines or the like, and, although potentially less important, the optimal timely use of resources and the meeting of required deadlines in a planning project.

The conventional computer assisted planning methods generally use for these aspects a generic time schedule, wherein planning activities are allocated a planning status according to a predefined planning strategy, more in particular, a particular scheduling algorithm that complies with the constraints that the particular planning is bound to for a particular project in the supply chain. In this respect, the major enterprises where planning plays a crucial role in the production and manufacturing of goods, which encompasses almost all branches of the industry, use IT-systems such as for example supply chain management systems developed by SAP AG. A recurring task that these IT-system need provide support for is the planning of projects, for example, multifold use of production systems, logistic planning in transport systems, cross docking etc. For these day to day planning problems, simplified and generic planning support systems are developed and integrated in IT-systems, wherein optimization schemes are used and (often non-optimized) heuristic planning schemes that offer a fast and reliable rule of thumb planning strategy.

These planning support systems often use a particular planning strategy that is fixed according to a planning model discussed in literature. For the most part, a central part of the planning problem is solved in praxis, however, important context specific details are often missed since these are not accounted for in such generic systems. This causes that important constraints of the particular planning project are missed or not sufficiently accounted for. For the multitude of business specific planning requirements, hitherto it has been very hard to develop a planning method for use in a computer system, that is configured to comply with all these business specific requirements. Furthermore, the detailed and specific development of such specialized applications is very cost intensive and economically unattractive.

The invention has as one of its objects to comply with the above problems and provide a framework that is arranged to be flexibly adapted according to certain (business) specific planning requirements. On the other hand, the invention has as an object to provide a framework that has a generic character to be able to flexibly comply with varying demands.

To this end, the invention provides a method according to the features of claim 1. By providing a first software layer (data layer) for storing and manipulating planning data relative to the planning project; and providing a second software layer (application layer) for communicating with the first software layer, the second layer arranged for preparing a predetermined planning method, the invention embodies a framework for handling multilevel planning problems, so to say, by a multilayered approach in handling these plannings.

By such a framework, the invention is able to offer an environment where a planning algorithm is executed on multiple layers, wherein generic modules can be executed as fast modules in an environment (data layer) that is highly optimized in terms of load on time and system resources. The specifically adapted modules that are embodying a particular planning strategy can be arranged as directing modules that can operate on a layer that need to be less optimized but is highly flexible (application layer). By such a multilayered framework a simple and flexible approach is made possible in solving business specific planning problems. This also provides an approach that is far more efficient and less time-consuming in developing new or adapted planning support systems than the conventional systems.

SUMMARY

Consistent with the present invention, a method provides a planning framework for use to solve planning problems. The method comprises: providing a first software layer for storing and manipulating planning data relative to the planning project; and providing a second software layer for communicating with the first software layer, the second layer arranged for preparing a predetermined planning method.

Consistent with the present invention, a computer system provides a planning framework for use to solve planning problems. The computer system comprises: a first software layer comprising a plurality of generic modules for storing and manipulating planning data relative to the planning project; a second software layer comprising a plurality of modules adaptable for a predetermined planning method for communicating with the first software layer, said plurality of adapted modules arranged for initiating, preparing and/or post processing said predetermined planning method; and an interface comprising a user interface, combining said first and second software layer and controlling the program flow of said plurality of generic and adapted modules.

It is to be understood that both the foregoing general description and the following detailed description are exemplary and explanatory only, and should not be considered restrictive of the scope of the invention, as described and claimed. Further, features and/or variations may be provided in addition to those set forth herein. For example, embodiments of the invention may be directed to various combinations and sub-combinations of the features described in the detailed description.

BRIEF DESCRIPTION OF THE DRAWINGS

The accompanying drawings, which are incorporated in and constitute a part of this disclosure, illustrate various embodiments and aspects of the present invention. In the drawings.

DETAILED DESCRIPTION

Figure 1:
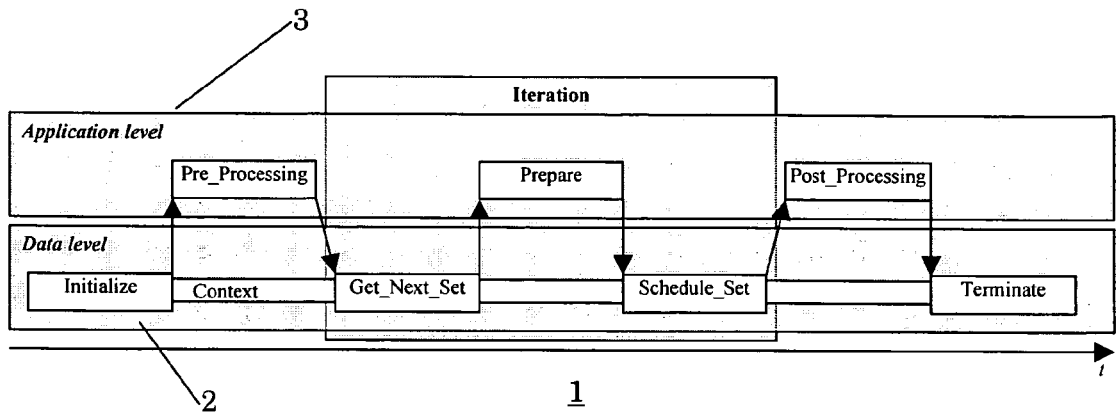
FIG. 1 shows the program flow of the method according to the invention.

The following detailed description refers to the accompanying drawings. Wherever possible, the same reference numbers are used in the drawings and the following description to refer to the same or similar parts. While several exemplary embodiments and features of the invention are described herein, modifications, adaptations and other implementations are possible, without departing from the spirit and scope of the invention. For example, substitutions, additions or modifications may be made to the components illustrated in the drawings, and the exemplary methods described herein may be modified by substituting, reordering or adding steps to the disclosed methods. Accordingly, the following detailed description does not limit the invention. Instead, the proper scope of the invention is defined by the appended claims.

Figure 2:
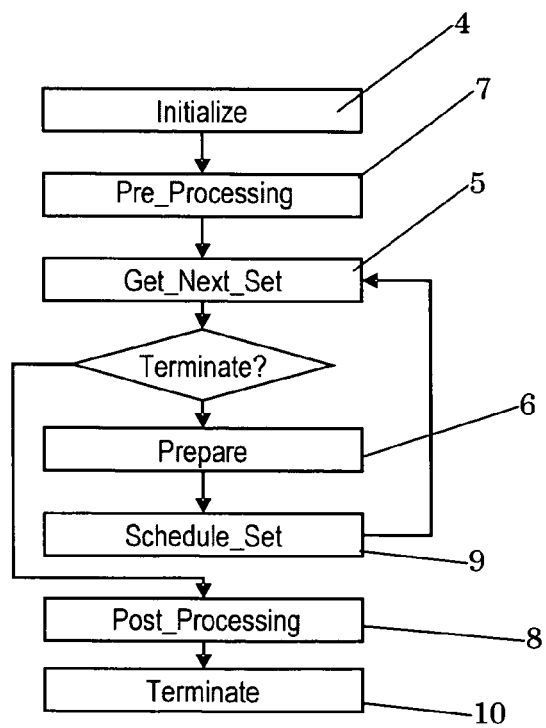
FIG. 2 shows the context of the modules executed according to FIG. 1.

FIG. 1 and FIG. 2 provide an embodiment of the invention, wherein the program flow of the planning procedure is illustrated to be executed on multiple layers. In the computer system 1 a first software layer 2, a so called data layer, is present for storing and manipulating planning data relative to the planning project. Further a second software layer 3, called application layer, is present, for communicating with the first software layer, the second layer arranged for pre processing, preparing and post processing a predetermined planning method. In this embodiment a predetermined planning is performed by first executing a general initializing procedure 4 performed on the data layer. In this initializing procedure 4 planning activities of the planning project are formed as nodes in a planning network and planning task dependencies are formed as borders in said planning network, for an example, see FIG. 3.

Next, the fast procedure "GetNextSet" 5 returns a set of activities from the scheduling net, created with "Initialize" 4. The goal is to start "GetNextSet" until all activities from the planning network are processed. All activities returned by "GetNextSet" are sources, which means that these activities are not predecessed by an unplanned activity. As an example, the following table shows a variety of possible planning parameters.

TABLE 1

| Actid | Id of activity |
| --- | --- |
| Mode_No | Mode no. |
| Resid | Id of resource |
| Is_mode_valid | This flag indicates, if the mode is valid or not. |
| | ET_ACT_DATES will contain one entry for each valid mode and for the initial mode. If the initial mode is not valid this flag is "false". |
| Initial_Mode | Mode of activity before "Initialize" |
| Initial_Resid | Resid for Initial_Mode |
| Initial_Start | Activity's start time before "Initialize" |
| Initial_End | Activity's end time before "Initialize" |
| EarlStart | This field contains the earliest start time of the activity, which is calculated for compact operations. |
| | It is not smaller than the plan start time |
| LateStart | This field contains the latest start time of the activity, which is calculated for compact operations. |
| | It does not exceed plan horizon |

TABLE 1-continued

| Actid | Id of activity |
| --- | --- |
| EarlEnd | This field contains the earliest end time of the activity, which is calculated for compact operations. |
| | It is not smaller than the plan start time |
| LateEnd | This field contains the latest end time of the activity, which is calculated for compact operations. |
| | It does not exceed plan horizon. |
| ValidityEarlStart | This field contains the earliest start time of the activity's validity period. |
| ValidityLateStart | This field contains the latest start time of the activity's validity period. |
| ValidityEarlEnd | This field contains the earliest end time of the activity's validity period. |
| ValidityLateEnd | This field contains the latest end time of the activity's validity period. |
| CompStart | This field contains the start time of an activity for compact scheduling. |
| | It is not smaller than the plan start time. |
| CompEnd | This field contains the end time of an activity for compact scheduling. |
| | It does not exceed plan horizon |
| ConstrLateStart | This field contains the latest start time of an activity, considering maximum constraints. |
| | It is not smaller than the plan start time |
| ConstrLateEnd | This field contains the latest end time of an activity, considering maximum constraints. |
| | It does not exceed plan horizon |
| ConstrEarlStart | This field contains the earliest start time of an activity, considering maximum constraints. |
| | It is not smaller than the plan start time |
| ConstrEarlEnd | This field contains the earliest end time of an activity, considering maximum constraints. |
| | It does not exceed plan horizon |

GetNextSet 5 calculates proposed values for the dates EarlStart, LateStart, EarlEnd, LateEnd, CompStart, CompEnd. For the calculation of the fields ConstrLateStart, ConstrLateEnd, ConstrEarlStart, ConstrEarlEnd the process depending time is used. The fields ValidityEarlStart, ValidityLateStart, ValidityEarlEnd, and ValidityLateEnd contain the times that are coming from the activities validity period. In this respect, by planning an activity, a valid planning status is allocated to said activity.

Then, a preparation procedure 6 is performed on the flexible software layer 2, wherein the planning preparation according to a predefined planning strategy is performed.

The computer system 1 may be arranged in the form of a client server-system where database servers run the data layer and application servers the application layer. The data layer 2 is specifically adapted for storing and manipulating planning data using fast database structures. The application layer 3 of the server system 1 comprises adaptable modules. These adaptable modules (called flex modules) embody particular planning strategies and can be arranged as directing modules that can operate on a layer that is highly flexible. By such a multilayered framework a simple and flexible approach is made possible in solving business specific planning problems. This also provides an approach that is far more efficient and less time-consuming in developing new or adapted planning support systems than the conventional systems. It is noted that FIG. 1 and FIG. 2 further show pre and post processing routines (indicated as the Pre_Processing 7 and Post_Processing 8 steps) executed on the application layer 3. These routines are merely used inter alia for starting and finishing the interfacing between the two layers.

Figure 3:
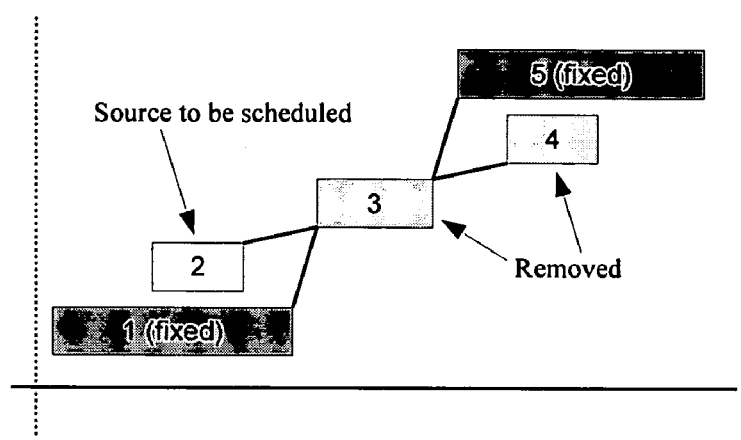
FIGS. 3-5 show examples of a specific heuristic planning.
Figure 4:
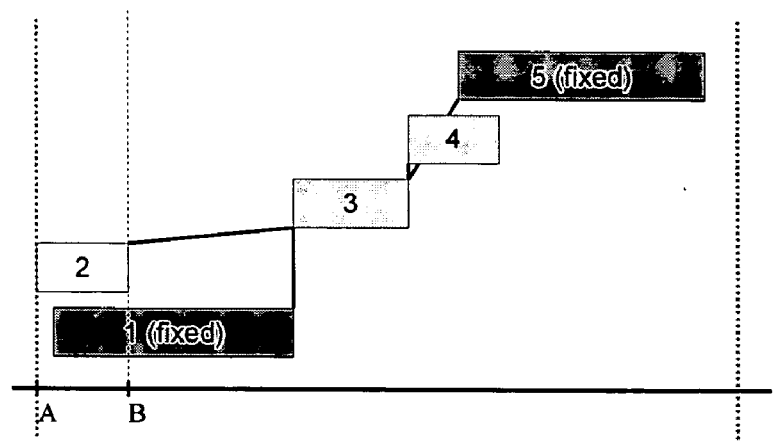
Figure 5:
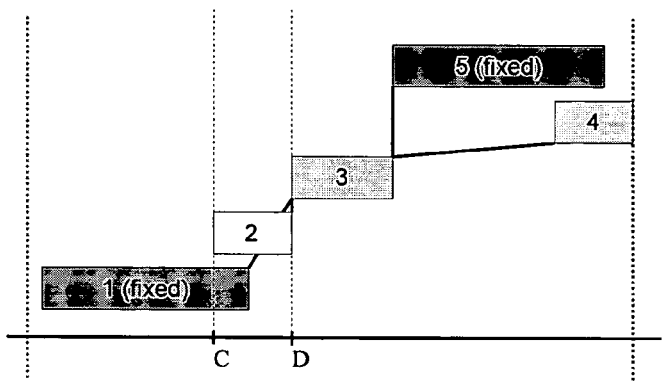

FIG. 3-FIG. 5 show examples of a specific heuristic planning: FIG. 3 shows a starting configuration of a small exemplary planning network, wherein activity 2 is to be scheduled.

FIG. 4 shows activity 2 scheduled according to an Earliest Start and Earliest End heuristic strategy, returned by "GetNextSet" 5. FIG. 5 shows activity scheduled according to a Latest Start and Latest End heuristic strategy. These planning parameters can be configured by the preprocessing and preparation modules that are active on the application layer 3 of the computer system 1.

Figure 6:
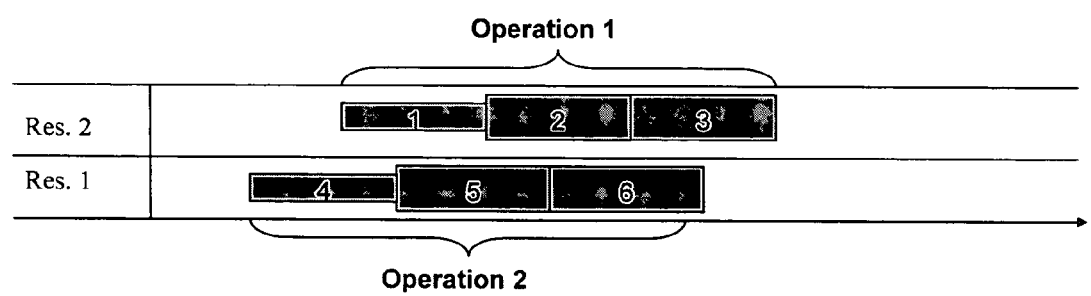
FIG. 6 shows the handling of a planning set in a project to be planned.

FIG. 6 shows the how ScheduleSet 9 plans complete operations. If only one activity of an operation is passed to ScheduleSet, it will plan all activities of the same operation. In this example, all activities of the same operation are planned compactly without gaps inbetween. The sequence GetNextset 5, Prepare 6 and ScheduleSet 97 is run iteratively until all activities are planned and no activities are present that do not have an invalid predecessor that is not planned. During the iteration, it is possible in certain planning variants to reallocate an activity as being invalid. In this way, a backtracking Heuristic can be developed.

Finally, when all activities are planned, the "Terminate" module 10 is activated, which clears the context of the application and certifies that no further activities have an unplanned status.

Figure 7:
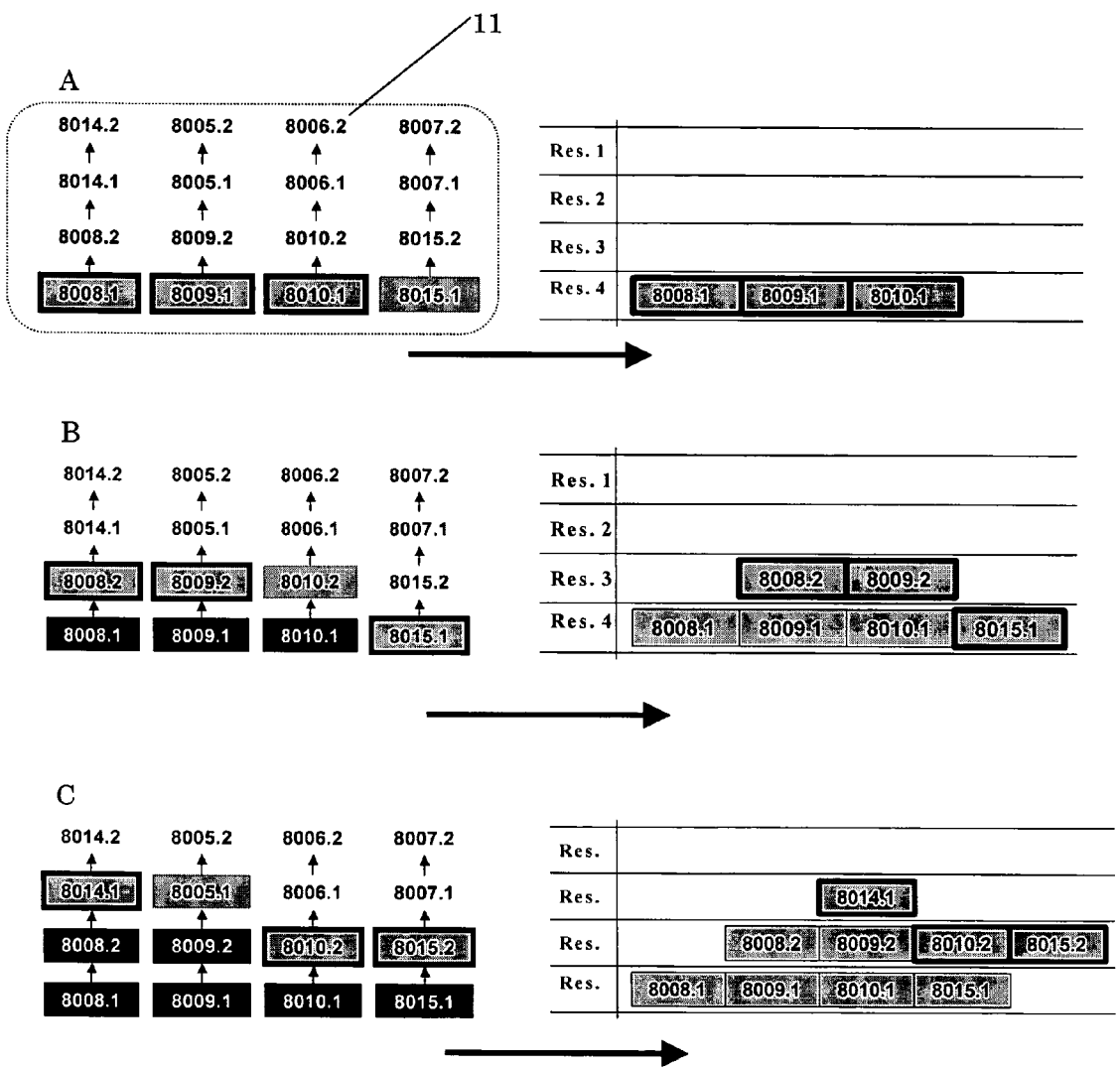
FIG. 7 shows a multi-level scheduling procedure exemplary for implementing the method according to the invention.

FIGS. 7A-C shows a sequence of plannable activities that are to be scheduled in a four-level production step, for instance in a specific scheduling problem for machine scheduling or project planning according to a specific business scenario. In the embodiment, four resources are present (Res.1-Res.4). The activities are to be scheduled optimally, wherein the activities of an the order need to be scheduled.

FIG. 7A already shows the first step of the inventive method executed, wherein according to step 5 a scheduling network 11 is created, wherein the nodes of the network 119 represent activities, and the edges of the network define the sequence for scheduling. Accordingly, for activity 8008 a level 1 (8008.1) step is required, and a level 2 step (8008.2). Next, activity 8014 is to be executed, in two subsequent levels (8014.1-8014.2) as well. Other activities are scheduled similarly.

According to the method of the invention, this scheduling network 119 is the base for scheduling and is created directly on the fast module layer 2 described with reference to FIG. 1 and FIG. 2. In this layer 2, the programs are executed in C++ language, and are not reachable by the application layer 3 where mostly application programs are executed that are implementing a specific heuristic planning strategy.

FIG. 7A further shows the next step 6 of the inventive method, wherein the sources of the network are identified to be handled in the next planning step, that is, the activities, which do not have an unscheduled predecessor. This is indicated by the greyed boxes 8008.1, 8009.1, 8010.1 and 8015.1. Again, this identifying of sources is a routine step that is performed on the fast layer 2 using optimized network handling routines executed in C++.

Then, the inventive method exports from the fast layer 2 the sources to be scheduled to the application layer 3, wherein specific heuristics can be applied using dedicated application languages. These heuristics for example are used for selecting a set of predetermined sources, or instructing the planning engine active on layer two in provide a specific planning mode, such as for example referenced in the above identified Table 1. Here, the advantage of the invention is used optimally, since handling of the network can be controlled while iterating the planning steps, each time selecting an optimized planning mode and strategy that is best, and "pushing" such an intermediate starting condition back to the planning layer, wherein the network is further arranged using dedicated optimized planning software. FIG. 7A shows that according to the exemplary heuristics executed in the preparation step 6, only sources 8008.1, 8009.1 and 8010.1 are to be scheduled in the next step (indicated by the bold edges). The source 8015.1 is kept for later use. Such a preparation step may consist of pre-scheduling and post-scheduling routines that may be presented in the form of customer add-ins. After scheduling in step 108 the activities selected in the preparation step 76, FIG. 7B shows sources 8008.1, 8009.1 and 8010.1 scheduled (indicated as black boxes). In the next iteration, already indicated in FIG. 7B, the next set of sources 8008.2, 8009.2, 8010.2, 8015.1 is identified by the Get_Next_Set routine 5. A selection of these sources (8008.2, 8009.2, 8015.1) is identified in Prepare 6 in this next iteration, and is scheduled in Schedule_Set 97 as indicated in FIG. 7B. FIG. 7C shows the continuation of this planning process, wherein in the next iteration new sources 8014.1, 8005.1, 8010.2 and 8015.2 are identified in step 56, and 8014.1, 8010.2 and 8015.2 are selected by the preparation step 6. This sequence is repeated until all sources are scheduled and no more unscheduled sources exist. Then the Terminate module 108 is activated, exporting a calculated planning optimized according to a predetermined heuristic specified (among others, but in principle mainly) by the preparation step 6.

While the invention is described with reference to the embodiments disclosed in the figures it is no way limited thereto but only is presented for illustrative purposes. The computational aspects described here can be implemented in digital electronic circuitry, or in computer hardware, firmware, software, or in combinations of them. Where appropriate, aspects of these systems and techniques can be implemented in a computer program product tangibly embodied in a machine-readable storage device for execution by a programmable processor, and method steps can be performed by a programmable processor executing a program of instructions to perform functions by operating on input data and generating output.

The invention may also be implemented in an article of manufacture with a computer usable medium having computer readable instructions embodied therein for providing access to resources available on that computer, the computer readable instructions comprising instructions to cause the computer to perform a part of a method according to the invention. The invention may also be implemented as a computer program for running on a computer system, at least including code portions for performing steps of a method according to the invention when run on a computer system or enabling a general propose computer system to perform functions of a filter device according to the invention. Such a computer program may be provided on a data carrier, such as a CD-ROM or diskette, stored with data loadable in a memory of a computer system, the data representing the computer program. The data carrier may further include a data connection, such as a telephone cable or a wireless connection transmitting signals representing a computer program according to the invention.

While certain features and embodiments of the invention have been described, other embodiments of the invention will be apparent to those skilled in the art from consideration of the specification and practice of the embodiments of the invention disclosed herein. It is intended, therefore, that the specification and examples be considered as exemplary only, with a true scope and spirit of the invention being indicated by the following claims and their full scope of equivalents.

What is claimed is:

1. A computer-implemented method for providing a planning framework for use to solve a planning problem comprising the steps, performed by a processor, of:

providing, using the processor, a first software layer as a data layer of the planning framework for storing and manipulating planning data relative to a planning project;

providing, using the processor, a second software layer for communicating with the first software layer; and performing a plurality of generic procedures on the first software layer and performing a plurality of adapted procedures on a second software layer in an alternate manner, such that each procedure performed on the first software layer is followed by a procedure performed on the second software layer, wherein performing the plurality of generic procedures and performing the plurality of adapted procedures comprise:

executing a general initializing procedure, on the first software layer, for generating planning activities in the planning project, wherein the planning activities are formed as nodes in a planning network and planning activity dependencies are formed as borders of the planning network, both the nodes and the borders executing on the data layer of the planning framework;

executing a preprocessing procedure, on the second software layer, for determining at least one planning parameter associated with the planning activities in the planning network;

executing a planning procedure, on the first software layer, for returning source activities among the planning activities from the planning network;

executing a preparing procedure, on the second software layer, for selecting a plurality of planning activities to be scheduled at a present iteration from the source activities returned in the planning procedure based on the at least one planning parameter;

setting aside at least one planning activity among the source activities returned in the planning procedure for a next iteration; and executing a schedule setting procedure, on the second software layer, for determining the order in which the planning activities selected in the preparing procedure are to be scheduled.

2. The computer-implemented method according to claim 1, wherein said preparing procedure is a heuristic planning method.

3. The computer-implemented method according to claim 1, wherein the generic procedures performed on the first software layer are optimized for processing the planning data, and wherein the adapted procedures performed on the second software layer are adaptable for a specific heuristic planning method.

4. The computer-implemented method according to claim 3, wherein the procedures performed on the first software layer and the procedures performed on the second software layer are configurable.

5. The computer-implemented method according to claim 2, wherein the heuristic planning method is a multi-level planning problem.

6. The computer-implemented method according to claim 1, further comprising allocating a valid planning status to a planning activity that is valid with respect to said preparing procedure.

7. The computer-implemented method according to claim 1, wherein the general initializing procedure, the preprocessing procedure, and the planning procedure are performed iteratively until a predetermined criterion is met.

8. The computer-implemented method according to claim 6, wherein the general initializing procedure, the preprocessing procedure, and the planning procedure are performed iteratively until a predetermined criterion is met, and the predetermined criterion are a maximum of iterations, a predetermined optimization parameter, or every planning activity is allocated a valid planning status.

9. The computer-implemented according to claim 6, wherein at least some of the planning activities in said planning network are temporarily allocated an invalid planning status.

10. The computer-implemented method according to claim 1, wherein the schedule setting procedure further comprises a scheduling adjustment for a scheduling window of a planning activity in a resource.

11. The computer-implemented method according to claim 1, wherein only a selected number of activities are planned according to the schedule setting procedure.

12. A computer system for providing a planning framework for use to solve a planning problem, comprising:

a computer processor;

a computer-readable storage medium;

a first software layer as a data layer of the planning framework embodied on the computer-readable storage medium comprising a plurality of generic modules, executed by the computer processor, for storing and manipulating planning data relative to a planning project, said plurality of generic modules comprising:

a preprocessing module for determining at least one planning parameter, and a preparing module for selecting a plurality of planning activities to be scheduled at a present iteration from source activities returned in a planning procedure based on the at least one planning parameter, and setting aside at least one planning activity among the source activities returned in the planning procedure for a next iteration;

a second software layer embodied on the computer-readable medium comprising a plurality of modules adaptable for a predetermined planning method for communicating with the first software layer, said plurality of adapted modules comprising:

a general initializing module for generating planning activities in the planning project, wherein the planning activities are formed as nodes in a planning network and planning activity dependencies are formed as borders of the planning network, both the nodes and the borders executing on the data layer of the planning framework;

a planning module for returning the source activities from the planning network, and a schedule setting module for determining the order in which the planning activities selected in the preparing procedure are to be scheduled; and an interface comprising a user interface, combining said first and second software layers and controlling the program flow between said plurality of generic and said plurality of adapted modules in an alternate manner, such that each procedure performed on the first software layer is followed by a procedure performed on the second software layer.

13. The computer system according to claim 12, comprising a client-system comprising a user interface and at least one server-system communicatively connected to said client-system, the server-system arranged for running at least said first or second software layer.

14. A computer program product, comprising a non-transitory computer-usable medium having a computer-readable program code embodied therein, the computer-readable program code adapted to be executed by a computer processor to implement a method for solving a business problem, the method comprising:

provide a first software layer as a data layer of the planning framework for storing and manipulating planning data relative to a planning project;

providing a second software layer for communicating with the first software layer; and performing a plurality of generic procedures on the first software layer and performing a plurality of adapted procedures on the second software layer in an alternate manner, such that each procedure performed on the first software layer is followed by a procedure performed on the second software layer, wherein performing the plurality of generic procedures and performing the plurality of adapted procedures comprise:

executing a general initializing procedure, on the first software layer, for generating planning activities in the planning project, wherein the planning activities are formed as nodes in a planning network and planning activity dependencies are formed as borders of the planning network, both the nodes and the borders executing on the data layer of the planning framework;

executing a preprocessing procedure, on the second software layer, for determining at least one planning parameter associated with the planning activities in the planning network;

executing a planning procedure, on the first software layer, for returning source activities among the planning activities from the planning network;

executing a preparing procedure, on the second software layer, for selecting a plurality of planning activities to be scheduled at a present iteration from the source activities returned in the planning procedure based on the at least one planning parameter;

setting aside at least one planning activity among the source activities returned in the planning procedure to a next iteration; and executing a schedule setting procedure, on the second software layer, for determining the order in which the planning activities selected in the preparing procedure are to be scheduled.

15. The computer-implemented method according to claim 1, wherein the source activities are not predecessed by an unplanned activity.

16. The computer system according to claim 12, wherein the source activities are not predecessed by an unplanned activity.

17. The computer program product according to claim 14, wherein the source activities are not predecessed by an unplanned activity.

* * * * *